United States Patent [19]

Dannatt

[11] 4,379,414

[45] Apr. 12, 1983

[54] HIGH RATIO SPEED REDUCER

[75] Inventor: Hugh St. L. Dannatt, Bethel, Conn.

[73] Assignee: Pitney Bowes Inc., Stamford, Conn.

[21] Appl. No.: 214,051

[22] Filed: Dec. 8, 1980

[51] Int. Cl.³ .............................................. F16H 1/28
[52] U.S. Cl. ...................................... 74/805; 474/141
[58] Field of Search .................. 74/804, 805; 474/141

[56] References Cited

U.S. PATENT DOCUMENTS

| 3,190,149 | 6/1965 | Gorfin | 74/805 |
| 4,307,630 | 12/1981 | Osborn | 74/805 |

FOREIGN PATENT DOCUMENTS

| 480963 | 3/1938 | United Kingdom | 74/805 |

*Primary Examiner*—Allan D. Herrmann

*Attorney, Agent, or Firm*—Melvin J. Scolnick; Albert W. Scribner; William D. Soltow, Jr.

[57] ABSTRACT

A high ratio speed reducer comprising a rotatable input shaft operatively coupled to an output shaft which rotates at a reduced speed in response to rotation of the input shaft. An output sprocket is mounted on the output shaft for rotation therewith, the output sprocket having a circumferential perimeter including a number of teeth. A drive sprocket having a circumferential perimeter including a number of teeth differing by at least one tooth from the number of output sprocket teeth is rotatably mounted with respect to an eccentric end portion of the input shaft and orbits as the input shaft is rotated. Successive segments of the drive sprocket perimeter continuously move outside the output sprocket perimeter as the drive sprocket orbits to advance an endless double chain engaging both sprockets.

8 Claims, 7 Drawing Figures

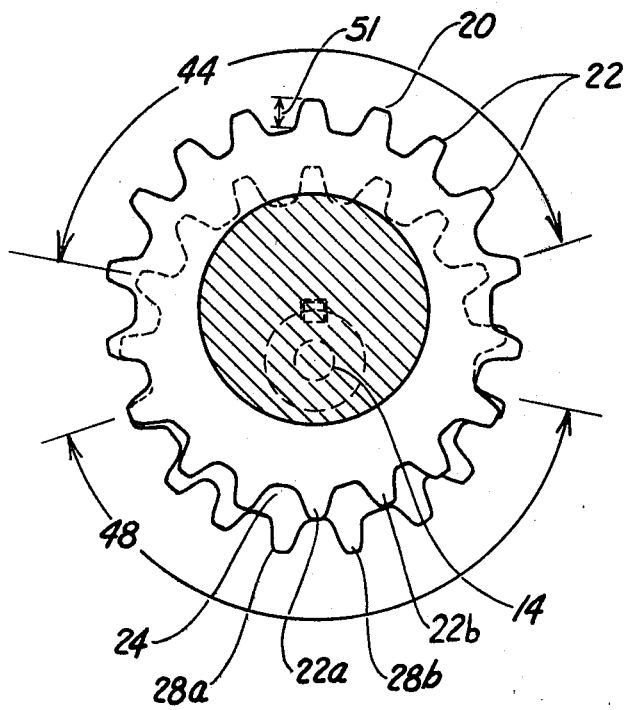
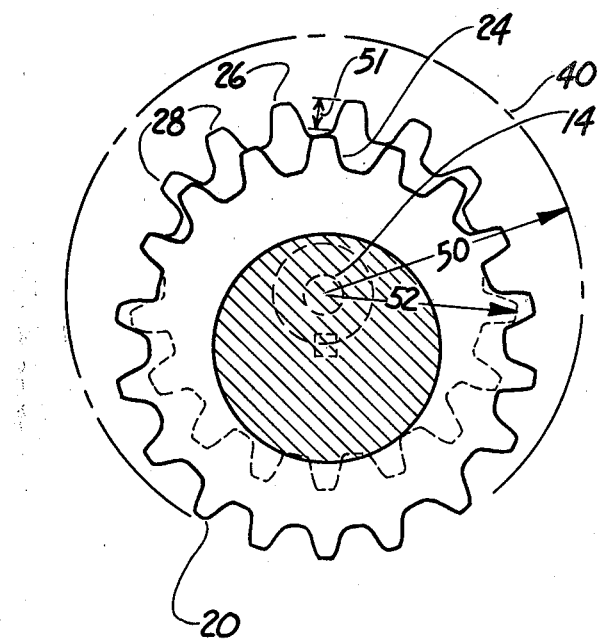

HIGH RATIO SPEED REDUCER

BACKGROUND OF THE INVENTION (1) Field of the Invention

The present invention relates to high ratio speed reducers, and, more particularly, the present invention relates to a speed reducer of the type employing a double chain engaging an orbiting drive sprocket and an output sprocket.

(2) Description of the Prior Art

Speed reducing mechanisms having drive and output sprockets engaging an endless double chain are known. One type of speed reducing mechanism is disclosed in U.S. Pat. No. 3,307,474 wherein the output sprocket has a number of teeth all engaging the double chain. The drive sprocket, which has fewer teeth than the output sprocket, orbits on an eccentric crank portion of an input shaft through a circular path having a diameter equal to the diameter of the output sprocket. In the patent it is recognized that it is desirable to have as many teeth on the drive sprocket as possible while still providing a minimal amount of clearance between the non-aligned disengaged teeth of the drive sprocket and the endless double chain. In one example given in this patent, the larger diameter output sprocket has thirty-five teeth and the drive sprocket has thirty-two teeth to provide minimum clearance between the disengaged teeth and the endless double chain.

U.S. Pat. No. 3,094,885 and U.S. Pat. No. 3,726,158 disclose similar speed reducing mechanisms having an orbiting drive sprocket and an output sprocket operatively coupled by an endless double chain.

It is an object of the present invention to provide a speed reducer wherein the number of teeth on the output sprocket differs by as few as one tooth from the number of drive sprocket teeth and clearance between the non-aligned disengaged drive sprocket teeth and the endless double chain is provided.

SUMMARY OF THE INVENTION

In accordance with the present invention, a high ratio speed reducer is provided. The speed reducer includes rotatable input and output shafts having a common axis. The input shaft has an eccentric end portion having a drive sprocket rotatably mounted thereon and orbiting with respect to the common axis as the input shaft is rotated. The number of teeth on the circumferential perimeter of the drive sprocket differs by as few as one tooth from the number of teeth on the output sprocket perimeter. To provide for maximum speed reduction, the number of drive sprocket teeth differs by one tooth from the number of output sprocket teeth. As the drive sprocket orbits, successive segments of the drive sprocket perimeter continuously move outside the output sprocket perimeter and clearance is provided between the non-meshing disengaged teeth of the drive sprocket and an endless double chain engaging both sprockets.

In accordance with one aspect of the invention, the number of drive sprocket teeth is less than the number of output sprocket teeth to provide for rotation of the drive and output shafts in the same direction.

In accordance with a further aspect of the invention, the number of drive sprocket teeth is greater than the number of output sprocket teeth to provide for rotation of the drive and output shafts in opposite directions. Additional advantages of a speed reducer in accordance with the present invention will be apparent from the following description of the preferred embodiment with reference to the drawings.

BRIEF DESCRIPTION OF THE DRAWINGS

FIG. 5 is a side view of the drive and output sprockets of the speed reducer shown in FIGS 1–4;

FIG. 6 is a side view of the drive and output sprockets shown in FIG. 5 after the drive sprocket has been orbited 180° from the position shown in FIG. 5;

DESCRIPTION OF THE PREFERRED EMBODIMENT

Figure 1:
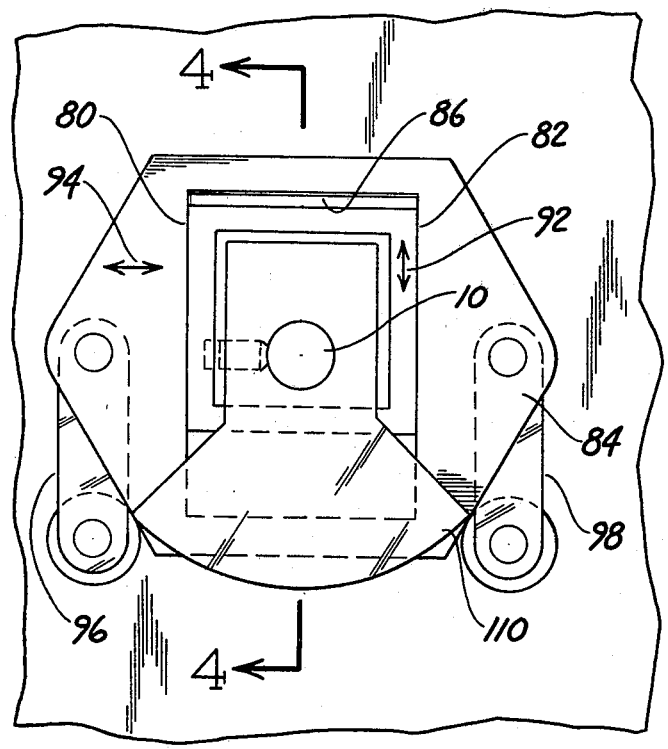
FIG. 1 is a front plan view of a speed reducer in accordance with the present invention.

Referring to the drawings, a high ratio speed reducer in accordance with the present invention is shown. The high ratio speed reducer comprises a rotatable input shaft 10 and a rotatable output shaft 12 having a common axis 14. Input shaft 10 is rotatable at one rotational speed and is coupled to output shaft 12 to rotate it at a substantially reduced speed.

Input shaft 10 has an eccentric end portion 16 preferably integrally formed with shaft 10. A drive sprocket 18 is rotatably mounted with respect to eccentric end portion 16 and orbits with respect to common axis 14 as input shaft 10 is rotated. Drive sprocket 18 has a circumferential perimeter 20 having a number of spaced teeth 22 thereon. Output sprocket 24 is mounted on the output shaft 12 for rotation therewith. Output sprocket has a circumferential perimeter 26 having a number of spaced teeth 28.

Figure 2:
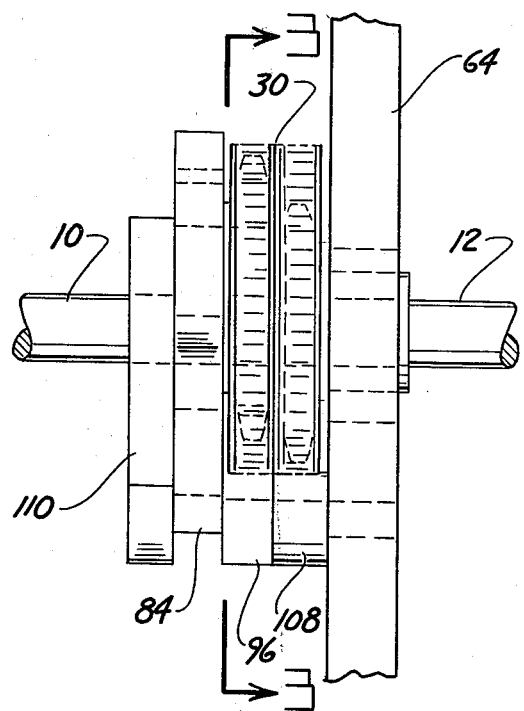
FIG. 2 is a side plan view of the speed reducer shown in FIG. 1.
Figure 3:
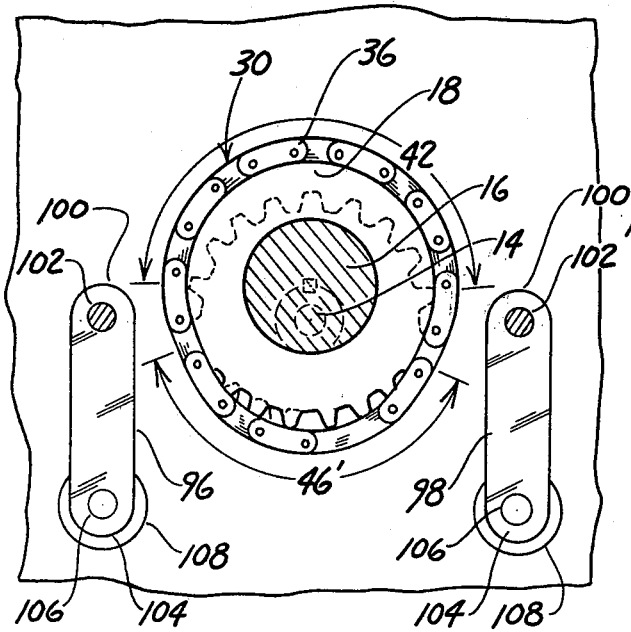
FIG. 3 is a side plan view of the speed reducer along the plane 3—3 of FIG. 2.
Figure 4:
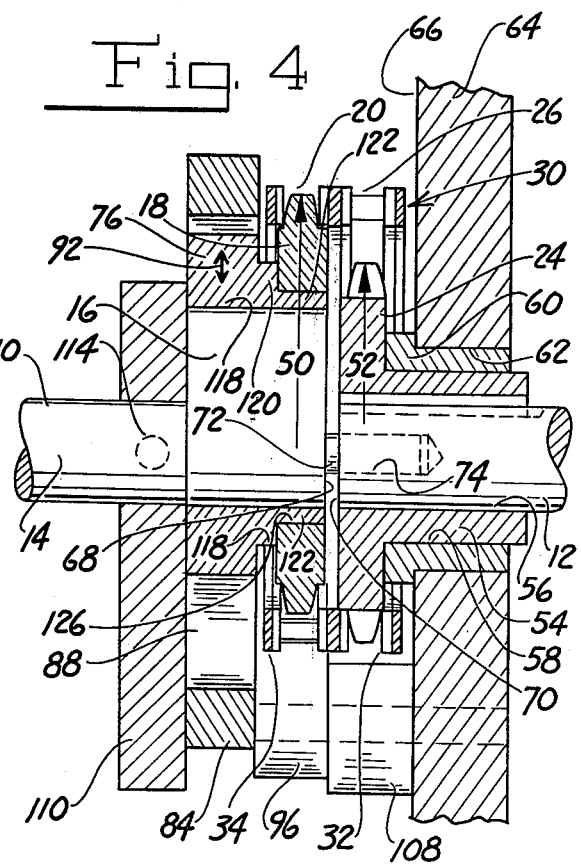
FIG. 4 is a sectional view of the speed reducer along the plane 4—4 of FIG. 1.
Figure 7:
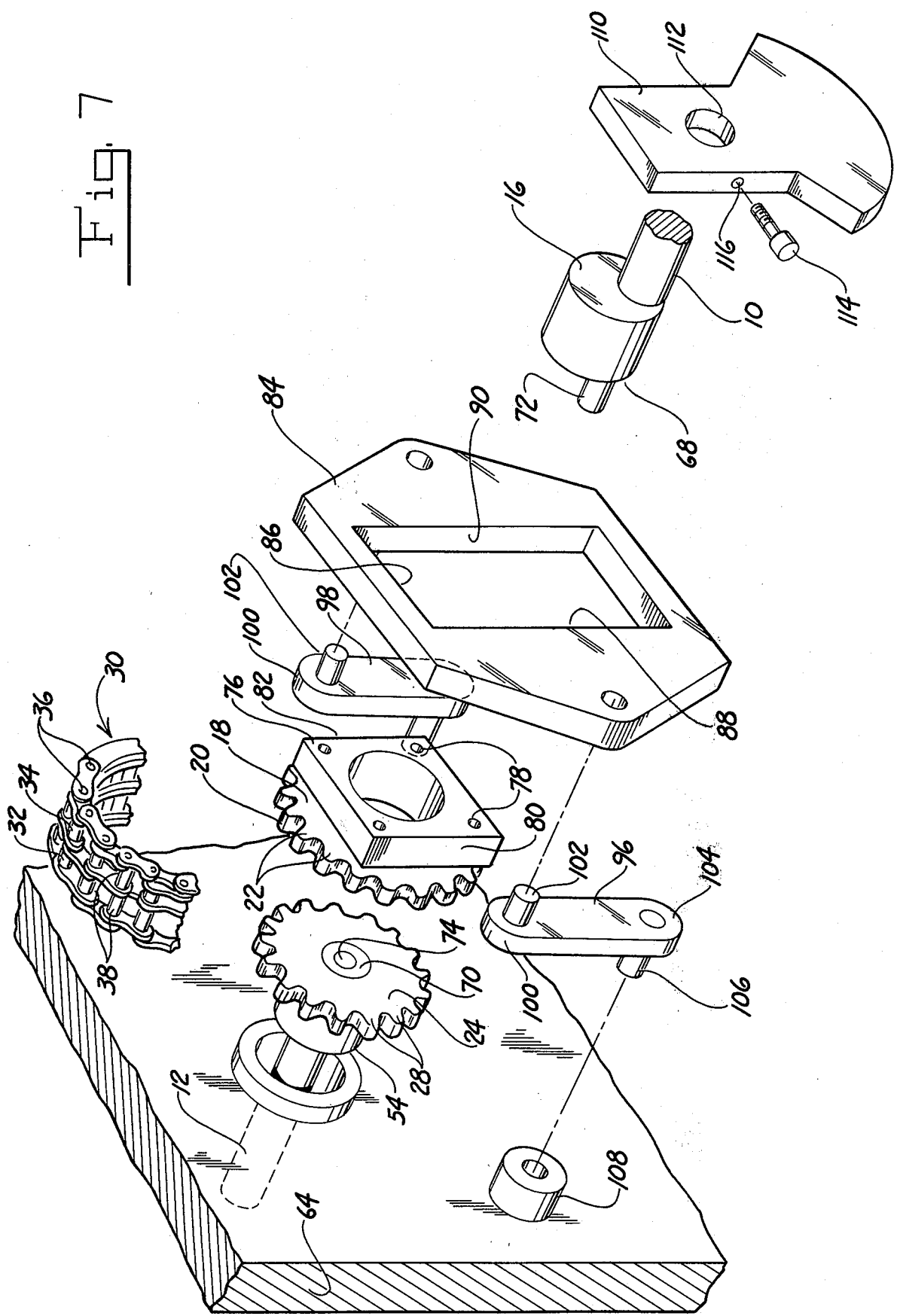
FIG. 7 is a perspective exploded view of the speed reducer shown in FIGS. 1–6.

Referring to FIGS. 2, 3, 4 and particularly FIG. 7, an endless double chain 30 engages both sprockets 18 and 24. Double chain 30 is conventional and includes a first strand 32 engaging the output sprocket 24 and a second strand 34 engaging the drive sprocket 18. The chain includes a plurality of pins 36 which extend through both chain strands 32 and 34 and have mounted thereon a plurality of rollers 38 for engaging the teeth of sprockets 18 and 24.

As best shown in FIGS. 3, 5 and 6, the perimeter 20 of drive sprocket 18 orbits through a circular path 40 (see FIG. 6) outside the output sprocket perimeter 26. Endless double chain 30 has a driving length portion 42 (see FIG. 3) engaging the teeth on the drive sprocket segment 44 (see FIG. 5) while being disengaged from the teeth 28 of the output sprocket 24. The endless chain 30 further includes a driven length portion 46 (see FIG. 3) diametrically opposite the driving length portion 42. The driven length portion 46 engages the teeth on the output sprocket segment 48 (see FIG. 5) and is disengaged from the drive sprocket teeth 22. As the drive sprocket 18 orbits, successive segments of the drive sprocket perimeter continuously move outside the output sprocket perimeter to rotate the output sprocket a small increment for each orbit of the drive sprocket.

Referring in particular to FIGS. 4, 5 and 6, the circular path 40 through which the drive sprocket 18 orbits has a radius 50 which is at least one tooth depth 51 greater than the radius 52 of the output sprocket 24. If insufficient clearance is provided, there will be tooth interference between the disengaged teeth on the drive sprocket and the endless drive chain 30 because the disengaged drive sprocket teeth are not in alignment with the engage output sprocket teeth. As shown in FIG. 5, drive sprocket teeth 22a and 22b, if moved downwardly with respect to the output sprocket from the position shown, would interfere with the operation of endless chain 30 which engages output sprocket teeth 28a and 28b are out of alignment with teeth 28a and 28b.

The number of teeth on the drive sprocket differs by at least one tooth from the number of output sprocket teeth to provide a speed reducer that converts a relatively high rotational speed of the input shaft into a reduced rotational speed of the output shaft. In the preferred embodiment of the invention, the number of output sprocket teeth differs by one tooth from the number of output sprocket teeth to provide for maximum reduction. In one embodiment of the invention, the number of drive sprocket teeth is one less than the number of output sprocket teeth and, in this instance, rotation of the input shaft in one direction will result in rotation of the output shaft in the same direction.

In accordance with another embodiment of the invention, the number of drive sprocket teeth is one tooth greater than the number of output sprocket teeth, and in this instance, rotation of the input shaft in one direction will result in rotation of output shaft in an opposite direction. Referring to FIGS. 5 and 6, the drive sprocket has eighteen (18) teeth and the output sprocket has seventeen (17) teeth. Thus, the input and output shafts would rotate in opposite directions.

Referring to FIGS. 1–4 and 7, the support mechanism for mounting the drive sprocket 18 with respect to the output sprocket 24 will now be described in detail. An axial bushing 54 extends from one side of output sprocket 24 and has a cylindrical cavity 56 for receiving shaft 12. Output sprocket 24 is mounted on the output shaft 12 for rotation therewith. The outer surface 58 of axial bushing 54 is rotatable with respect to a conventional roller bearing 60 having a plurality of rollers that abut surface 58 and allow rotation of bushing 54 with respect to roller bearing 60. Bearing 60 is secured in an aperture 62 of support plate 64. The output sprocket 24 is located at one side 66 of and adjacent to the support plate 64.

The drive sprocket is located adjacent the output sprocket 24. The input shaft 10 has an end portion 68 supported by and rotatable with respect to the end portion 70 of output shaft 12. More specifically, the end portion 68 of the input shaft includes a cylindrical pin 72 axailly alligned with the common axis 14. Pin 72 is received in a cylindrical axial socket 74 on the end 70 of output shaft 12 and pin 72 rotates within socket 74. The above described structure of supporting the input shaft on the end of the output shaft provides for a compact and simple speed reducer.

The speed reducer further includes a mechanism for preventing the drive sprocket 18 from turning as it orbits and this mechanism is best shown in FIGS. 4 and 7. The mechanism for preventing turning of the drive sprocket includes a slide body 76 attached, preferably by screws 78, to one side of the drive sprocket for movement therewith. The slide body 76 includes two parallel surfaces 80 and 82 which extend in parallel relation to the common axis 14 of the input and output shafts. A housing 84 includes an elongate slot 86 receiving the slide body 76. The elongate slot 86 includes two parallel slip surfaces 88 and 90 engaging the slide surfaces 80 and 82 of slide body 76 to permit reciprocal movement of slide body 76 in elongate slot 86 in a first direction transverse to the common axis 14. This first direction is shown by arrow 92 in FIGS. 1 and 4. The mechanism for preventing turning of the drive sprocket further includes a mechanism permitting reciprocal movement of the housing 84 in a second direction transverse to both the first direction 92 and the common axis 14 of the input and output shafts. This second direction is shown by the arrow 94 shown in FIG. 1. The mechanism permitting reciprocal movement of housing 84 includes two parallel linkage arms 96 and 98, each having one end 100 rotatably secured to housing 84 via pins 102. Linkage arms 96 and 98 have second ends 104 rotatably secured via pins 106 to bearings 108, which are fixed to support plate 64. It should be understood that the mechanism for preventing rotation of the drive sprocket as it orbits provides for a particularly compact speed reducer. Other mechanisms for preventing rotation of the drive sprocket may be used.

Referring to FIGS. 4 and 7, slide body 76 will now be described in greater detail. Slide body 76 includes a cylindrical opening 118 receiving cylindrical eccentric portion 16 of input shaft 10. A cylindrical spacing flange 120 extends from one side of slide body 76 and provides clearance for double chain 30. Slide body 76 also includes a cylindrical bushing 122 which engages the wall 124 of a central cylindrical aperture 126 in drive sprocket 18. This structure allows for rotation of the drive sprocket with respect to eccentric portion 16 as the drive sprocket orbits.

As input shaft 10 is rotated, eccentric portion 16 creates an unbalanced load on shaft 10. To compensate for this load, a counterweight 110 is provided and includes a hole 112 for receiving shaft 10. Set screw 114 is threaded in hole 116 and secures the counterweight to the shaft.

The speed reducer described above is particularly compact. Further, the reducer provides for maximum speed reduction in that the number of teeth on the drive sprocket may differ by as few as one tooth from the number of output sprocket teeth and still provide clearance between non-aligned disengaged teeth and double chain. Further, the number of drive sprocket teeth may be greater than the number of output sprocket teeth to provide for rotation of the output shaft in a direction opposite to the input shaft.

It should be understood that although specific embodiments of the invention have been described herein in detail, such description is for purposes of illustration only and modifications may be made thereto by those skilled in the art within the scope of the invention.

What is claimed is:

1. A high ratio speed reducer comprising: rotatable input and output shafts having a common axis, said input shaft having an eccentric portion;
   an output sprocket mounted on said output shaft for rotation therewith, said output sprocket having a circumferential perimeter including a number of teeth;
   a drive sprocket having a circumferential perimeter including a number of teeth differing by at least one tooth from the number of output sprocket teeth, said drive sprocket being rotatably mounted with respect to said eccentric portion of said input shaft and orbiting with respect to said common axis as said input shaft is rotated, a segment of said drive sprocket perimeter being located outside said output sprocket perimeter as said drive sprocket orbits;

an endless double chain engaging both sprockets, said chain having a driving length portion engaging said drive sprocket teeth on said segment while being disengaged from said teeth of said output sprocket, said chain having a driven length portion diametrically opposite said driving length portion engaging said output sprocket teeth and being disengaged from said drive sprocket teeth; and means for preventing turning of said drive sprocket as it orbits, including (i) a slide body attached to one side of said drive sprocket for movement therewith, said body including two parallel slide surfaces extending in parallel relation to said common axis of said input and output shafts; (ii) a housing including an elongate slot receiving said slide body, said elongate slot having two parallel slip surfaces engaging said slide surfaces of said slide body to permit reciprocal movement of said slide body in said slot in a first direction transverse to said common axis; and (iii) means permitting reciprocal movement of said housing in a second direction transverse to both said first direction and said common axis.

2. A speed reducer according to claim 1 wherein said number of drive sprocket teeth is one tooth less than the number of output sprocket teeth and wherein said input and output shafts rotate in the same direction.

3. A speed reducer according to claim 1 wherein said number of drive sprocket teeth is one tooth greater than the number of output sprocket teeth and wherein said input and output shafts rotate in opposite directions.

4. A speed reducer according to claim 1 wherein said drive and output sprocket teeth have a depth and said output sprocket has a radius and wherein said drive sprocket perimeter is moved through a circular path having a radius at least one tooth depth greater than the radius of said output sprocket.

5. A speed reducer according to claim 1 wherein said eccentric portion of said input shaft is cylindrical; said slide body includes an opening receiving said input shaft; and said drive sprocket includes a central cylindrical aperture receiving said cylindrical eccentric portion to allow rotation of said drive sprocket with respect to said eccentric portion as said drive sprocket orbits.

6. A speed reducer according to claim 5 and further including a support plate having an aperture for receiving said output shaft which is rotatable with respect to said support plate, said output sprocket being located at one side of and adjacent to said support plate, and said drive sprocket being located adjacent said output sprocket, said input shaft having at end portion supported by and rotatable with respect to said output shaft.

7. A speed reducer according to claim 6 wherein said end portion of said input shaft includes a cylindrical pin axially aligned with said common axis and wherein said output shaft includes a cylindrical axial socket for receiving said cylindrical pin.

8. A speed reducer according to claim 7 wherein said means for permitting reciprocal movement of said housing comprises two parallel linkage arms each having one end rotatably secured to said support plate and another end rotatably secured to said housing.

* * * * *